(12) United States Patent
DiBiase

(10) Patent No.: US 7,584,943 B2
(45) Date of Patent: Sep. 8, 2009

(54) LOADING DOCK BUMPER WITH REPLACEABLE METAL FACEPLATE

(75) Inventor: Joe DiBiase, Woodbridge (CA)

(73) Assignee: Frommelt Industries of Canada, Inc., Vaughan, Ontario (CA)

( * ) Notice: Subject to any disclaimer, the term of this patent is extended or adjusted under 35 U.S.C. 154(b) by 487 days.

(21) Appl. No.: 11/321,807

(22) Filed: Dec. 29, 2005

(65) Prior Publication Data

US 2007/0152390 A1  Jul. 5, 2007

(51) Int. Cl.
*B65G 69/22*  (2006.01)

(52) U.S. Cl. .................. 267/140; 248/635; 248/638; 114/219

(58) Field of Classification Search ............. 114/218, 114/219; 267/139, 140, 152, 153; 248/636–638
See application file for complete search history.

(56) References Cited

U.S. PATENT DOCUMENTS

| | | |
|---|---|---|
| 2,489,869 A | 11/1949 | Dunn |
| 2,649,295 A | 8/1953 | Schuyler |
| RE24,276 E | 2/1957 | Schuyler |
| 3,203,002 A | 8/1965 | McGuire |
| 3,268,199 A | 8/1966 | Kordyban et al. |
| 3,375,625 A | 4/1968 | Edkins et al. |
| 3,381,484 A | 5/1968 | Laughlin |
| 3,440,673 A | 4/1969 | Kelley |
| 3,469,717 A | 9/1969 | Bolt |
| 3,469,809 A | 9/1969 | Reznick et al. |
| 3,493,984 A | 2/1970 | Reinhard |
| 3,570,033 A | 3/1971 | Hovestad et al. |
| 3,610,609 A | 10/1971 | Sobel |
| 3,644,952 A | 2/1972 | Hatch |
| 3,665,997 A | 5/1972 | Smith et al. |
| 3,840,930 A | 10/1974 | Wanddell |
| 3,921,241 A | 11/1975 | Smith |
| 3,933,111 A | 1/1976 | von Bose et al. |
| 3,934,380 A | 1/1976 | Frommelt et al. |
| 3,935,684 A | 2/1976 | Frommelt et al. |

(Continued)

FOREIGN PATENT DOCUMENTS

CA          2158535          3/1997

(Continued)

OTHER PUBLICATIONS

VHL Vertically Movable Bottom Pad and Detail (copy), Blueprint Nos. 692-0125 and 692-0126; VHL Bottom Pads and VHL Bottom Pad detail; Frommelt Industries, Inc., dated Oct. 7, 1988, 2 pages.

(Continued)

*Primary Examiner*—Christopher P Schwartz
(74) *Attorney, Agent, or Firm*—Hanley, Flight & Zimmerman, LLC

(57) ABSTRACT

A bumper assembly for use at a loading dock comprises a resiliently compressible pad protected by a readily replaceable metal faceplate. The bumper assembly has certain metal components that move relative to each other as the bumper assembly is compressed by a vehicle backing into the dock. Those metal components are spaced apart from each other to avoid metal-to-metal frictional wear. In some cases, the compressible pad has internal cavities that help reduce the extent to which the core bulges under compression.

22 Claims, 4 Drawing Sheets

U.S. PATENT DOCUMENTS

| | | | |
|---|---|---|---|
| 3,964,422 A | | 6/1976 | Boyd |
| 4,098,211 A | * | 7/1978 | Files et al. ............... 405/213 |
| 4,420,849 A | | 12/1983 | Alten |
| 4,509,730 A | | 4/1985 | Shtarkman |
| 4,559,089 A | | 12/1985 | Dromsky et al. |
| 4,628,850 A | | 12/1986 | Day et al. |
| 4,682,382 A | | 7/1987 | Bennett |
| 4,744,121 A | | 5/1988 | Swessel et al. |
| 4,823,421 A | | 4/1989 | Kleynjans et al. |
| 4,844,213 A | | 7/1989 | Travis |
| 4,854,258 A | * | 8/1989 | Hausmann et al. ......... 114/219 |
| 4,893,576 A | | 1/1990 | Day et al. |
| 5,013,272 A | | 5/1991 | Watkins |
| 5,088,143 A | | 2/1992 | Alexander |
| 5,094,905 A | | 3/1992 | Murray |
| 5,110,660 A | * | 5/1992 | Wolf et al. ................. 428/178 |
| 5,247,897 A | | 9/1993 | Pepp |
| 5,264,259 A | | 11/1993 | Satoh et al. |
| 5,269,248 A | * | 12/1993 | Lee ........................... 114/219 |
| 5,450,643 A | | 9/1995 | Warner |
| 5,452,489 A | | 9/1995 | Gelder et al. |
| 5,644,812 A | | 7/1997 | Neufeldt et al. |
| 5,651,155 A | | 7/1997 | Hodges et al. |
| 5,658,633 A | * | 8/1997 | Di Biase ..................... 428/68 |
| 5,775,044 A | | 7/1998 | Styba et al. |
| 5,832,554 A | | 11/1998 | Alexander |
| 5,881,414 A | | 3/1999 | Alexander |
| 5,996,291 A | | 12/1999 | Styba et al. |
| 6,006,389 A | | 12/1999 | Alexander |
| 6,062,548 A | | 5/2000 | Nagao et al. |
| 6,070,283 A | | 6/2000 | Hahn |
| 6,120,871 A | * | 9/2000 | De Biase ..................... 428/68 |
| 6,209,857 B1 | | 4/2001 | Berends |
| 6,272,799 B1 | | 8/2001 | Ashelin et al. |
| 6,318,773 B2 | | 11/2001 | Storer |
| 6,360,394 B1 | | 3/2002 | Hahn |
| 6,497,076 B1 | | 12/2002 | van de Wiel et al. |
| 6,634,049 B2 | | 10/2003 | Hahn et al. |
| 6,832,403 B2 | | 12/2004 | Hahn et al. |
| 2002/0112418 A1 | | 8/2002 | Thill et al. |
| 2002/0157195 A1 | | 10/2002 | Alexander |
| 2007/0151819 A1 | | 7/2007 | Schmidt et al. |
| 2007/0152389 A1 | | 7/2007 | Kloppenburg et al. |

FOREIGN PATENT DOCUMENTS

| | | |
|---|---|---|
| CA | 2572522 | 6/2007 |
| CH | 685117 | 3/1995 |
| DE | 1684569 | 3/1971 |
| DE | 2800128 | 7/1979 |
| DE | 3018932 | 11/1981 |
| DE | 3242511 | 5/1984 |
| DE | 29503742 | 6/1995 |
| DE | 29600207 | 2/1996 |
| DE | 19612135 | 10/1997 |
| DE | 29716877 | 1/1998 |
| DE | 29804117 | 5/1998 |
| DE | 10313268 | 3/2004 |
| EP | 0040388 | 11/1981 |
| EP | 0168767 | 1/1986 |
| FR | 1151730 | 2/1958 |
| FR | 2686913 | 8/1993 |
| FR | 2841883 | 1/2004 |
| GB | 1161537 | 8/1969 |
| WO | 02070382 | 9/2002 |

OTHER PUBLICATIONS

VHL Vertically-moving Bottom Pad (Meijer pad), Drawing No. 692-0029; Adjustable Bottom Pad; Frommelt Industires, Inc., dated Oct. 17, 1985; 1 page.

Hafa Spring-Loaded Bumper Literature; Hafa GmbH technical Drawing; "Hohenbeweglicher Anfahrpuffer"; and accompanying memo dated Nov. 1995, 3 pages with a 3 page English translation.

Loading Dock Seal; "Loading Dock Seal" Brochure, Kinnear—Division of Harsco Corp., 1978, 4 pages.

Loading Systems Spec Sheet; "Loading Systems Mobile Dock Bumper RB 250M"; dated circa 1993; showing a vertically-adjustable spring-loaded dock bumper, 1 page.

PowerRamp Hydraulic Dock Leveler System Brochure; two-page "Power Ramp XL" brochure, circa Feb. 2004, 2 pages.

Super Seal Dock Sales Catalog; "Super Seal Dock Seals" Catalog 11160/SU; Super Seal Mfg. Ltd.; no date listed, but stamped "received" by the USPTO on Aug. 29, 1989, 8 pages.

EOD Steel-faced bumper; Assembly drawing of steel-faced bumper for EOD (edge-of-dock) leveler; Genquip Corporation; Dated Feb. 24, 2000 and evidencing sales of event date; 1 page.

Patent Cooperation Treaty, "International Search Report", issued by the International Searching Authority in connection with counterpart International PCT application serial No. PCT/IB2006/004288, mailed May 2, 2008 (7 pages).

Patent Cooperation Treaty, "Written Opinion of the International Searching Authority," issued in connection with counterpart International PCT application serial No. PCT/IB2006/004288, mailed May 2, 2008 (4 pages).

Patent Cooperation Treaty, "International Search Report", issued by the International Searching Authority in connection with International PCT application serial No. PCT/US2006/062617, mailed Jul. 11, 2008 (5 pages).

Patent Cooperation Treaty, "Written Opinion of the International Searching Authority," issued in connection with International PCT application serial No. PCT/US2006/062617, mailed Jul. 11, 2008 (6 pages).

International Bureau, "International Preliminary report on Patentability" issued in connection with International application Serial No. PCT/US2006/062617, mailed Aug. 21, 2008 (7 pages).

Vestil Manufacturing Corp., http://www.vestilmfg.com/products/Idsol/dock_bumpers.htm, Wayback Date: Mar. 29, 2001, Model B-1213-4PF (6 pages).

* cited by examiner

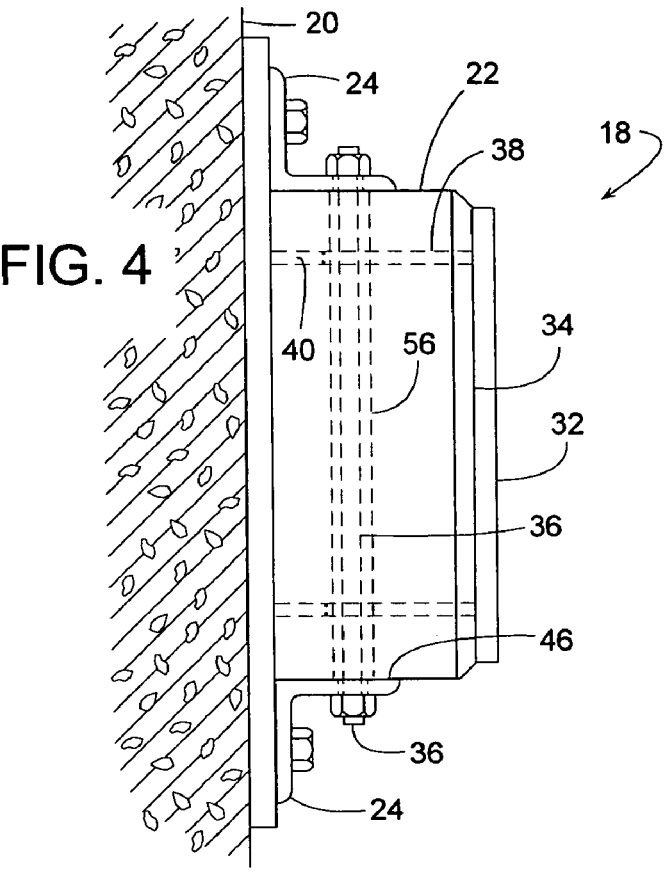
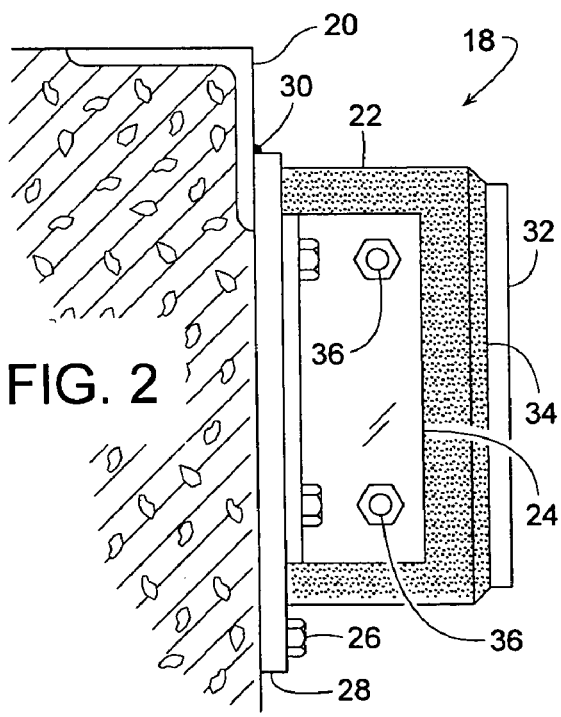
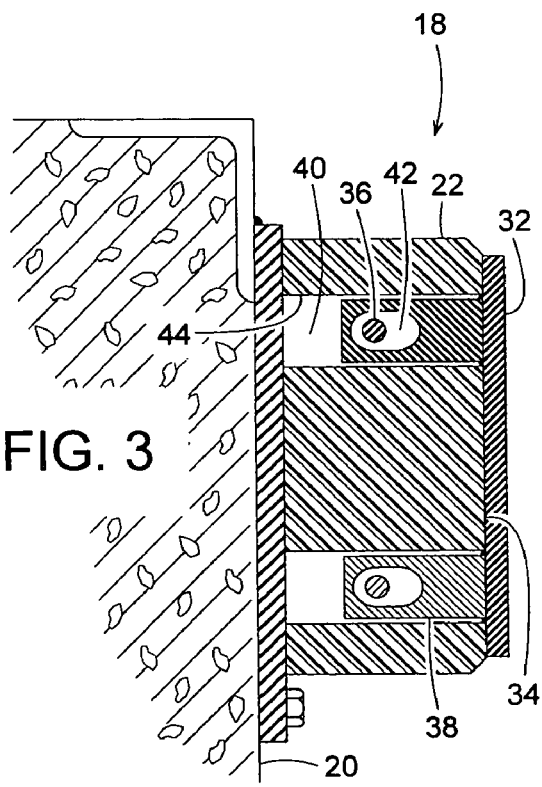

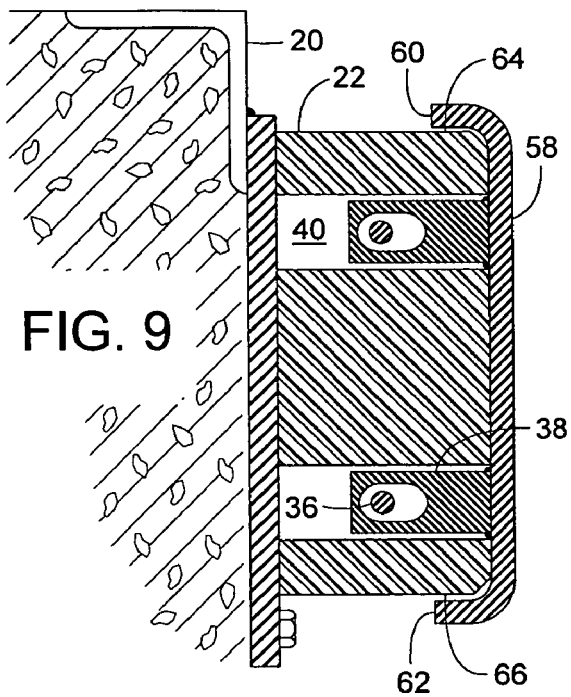
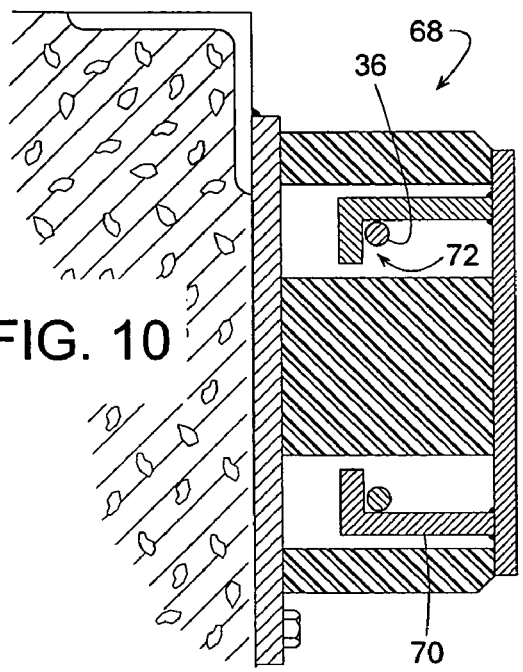
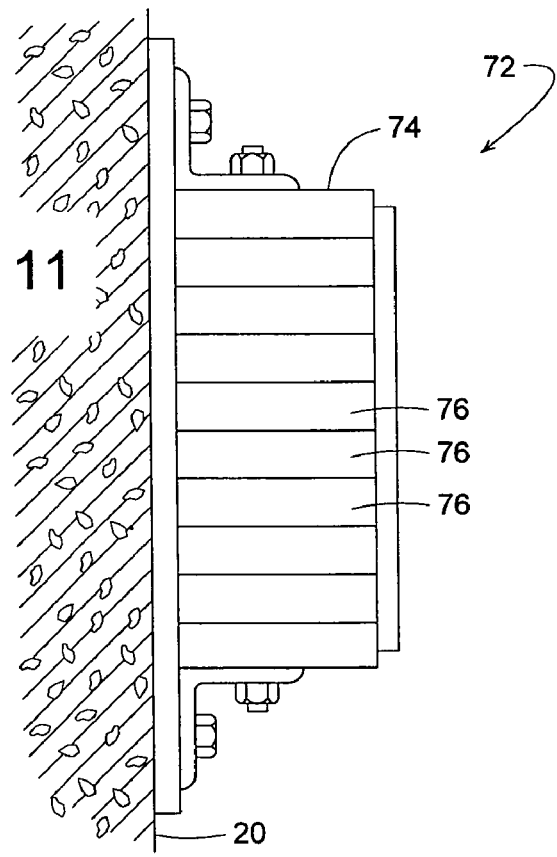

US 7,584,943 B2

LOADING DOCK BUMPER WITH REPLACEABLE METAL FACEPLATE

FIELD OF THE DISCLOSURE

The present disclosure generally pertains to loading dock bumpers, and more specifically to a dock bumper with a protective metal faceplate.

DESCRIPTION OF RELATED ART

A typical loading dock of a building includes an exterior doorway with an elevated platform for loading and unloading vehicles, such as trucks and trailers. In some cases, a loading dock may include a dock leveler to compensate for a height difference that may exist between the loading dock platform and an adjacent bed of a truck or trailer. Dock levelers typically include a deck whose front edge can be raised or lowered to the approximate height of the truck bed. An extension plate or lip may extend outward from the deck's front edge to span the gap between the rear of the truck bed and the front edge of the deck, thereby providing a path that allows personnel and material handling equipment to readily move on and off the truck bed during loading and unloading operations.

Dock bumpers are often installed near the doorway for several reasons. They can protect the face the building from vehicle impact; they can protect the rear end of the truck from damage; they can prevent a dock seal from being over compressed by a vehicle backing into the dock, and/or in cases where the dock includes a dock leveler, they can establish a predetermined minimum distance between the rear of the vehicle and the dock leveler so that the dock leveler has clearance to operate. Bumpers are typically made of a molded polymer such as rubber or a stack of rubber pads stamped out of old tires, conveyor belt material, or the like. The stack of rubber pads can be clamped between two steel plates. The plates hold the pads together and provide a way for installing the bumper to the loading dock. Bumpers are usually installed near the bottom of the doorway, adjacent either side of the dock leveler lip and protrude a few inches out from the face of the dock where they can be abutted by the rear of the vehicle.

Dock bumpers not only have to absorb the impact of trucks backing into the dock, but they must also endure tremendous vertical friction caused by weight being added and removed from the truck bed as the truck is being loaded or unloaded at the dock. Whenever a forklift, for instance, drives onto or off the truck bed, the truck's suspension allows the bed to rise and fall accordingly. The resulting friction between the face of the bumper and the back of the truck can quickly wear out the bumper.

Replacing a worn bumper can be surprisingly difficult and time consuming. Corroded anchor bolts and mounting plates that have been welded in place and may need to be cut off.

To prolong the life of bumpers and thus reduce their frequency of replacement, some bumpers have their impact absorbing material encased within a telescoping steel housing. The exterior steel plates of such a housing not only provide more wear resistance, but the steel plates also reduce the sliding friction between the bumper and the truck, as the coefficient of friction of metal-to-metal is generally much lower than that of rubber-to-metal.

Steel encased bumpers, unfortunately, have some drawbacks. First, a metal-to-metal sliding connection typically couples the bumper's front metal plate (which protects the underlying polymeric core) to a metal mounting bracket. As a truck is loaded or unloaded of its cargo, the truck's suspension reacts by allowing the truck to move up and down, and back and forth repeatedly. This repeated movement transfers to the bumper and can quickly wear out the metal-to-metal connection. Second, steel encased bumpers are usually very heavy, which makes them more difficult to install and replace than rubber ones. Often a hoist of some sort is needed to assist in replacing a steel encased bumper. In addition, there is typically metal to metal contact between the steel facing of such bumpers and their housing—inhibiting their range of free movement.

Consequently, a need exists for a dock bumper that is more durable than conventional rubber bumpers yet is easier to service or replace than today's steel encased bumpers.

SUMMARY OF THE DISCLOSURE

In some embodiments, a bumper assembly includes a tie rod that secures both a polymeric bumper and a metal faceplate to a metal bracket; however, the bracket is spaced apart from the faceplate.

In some embodiments, metal mounting tabs extend from the faceplate into the bumper.

In some embodiments, to restrict the faceplate's movement, the mounting tabs extend into a socket defined by the bumper.

In some embodiments, the bumper includes multiple compression cavities whose volumes decrease upon compression of the bumper, thereby reducing the bumper's outward expansion.

In some embodiments, the faceplate includes a peripheral flange that helps maintain the position of the faceplate relative to the bumper.

In some embodiments, the bumper is molded as a unitary piece.

In some embodiments, the bumper comprises a laminated stack of polymeric pads.

In some embodiments, the tie rod avoids the compressive force of a vehicle pressing against the bumper due to ample clearance between the tie rod and the bumper.

In some embodiments, sliding metal contact between relative moving parts is avoided.

BRIEF DESCRIPTION OF THE DRAWINGS

FIG. 2 is a side view of a bumper assembly shown in FIG. 1.

FIG. 3 is a cross-sectional view of the bumper assembly of FIG. 2.

FIG. 4 is a top view of the bumper assembly of FIG. 2.

FIG. 9 is a cross-sectional view of another embodiment of a bumper assembly.

FIG. 10 is a cross-sectional view of another embodiment of a bumper assembly.

FIG. 11 is a side view of another embodiment of a bumper assembly.

DESCRIPTION

Figure 1:
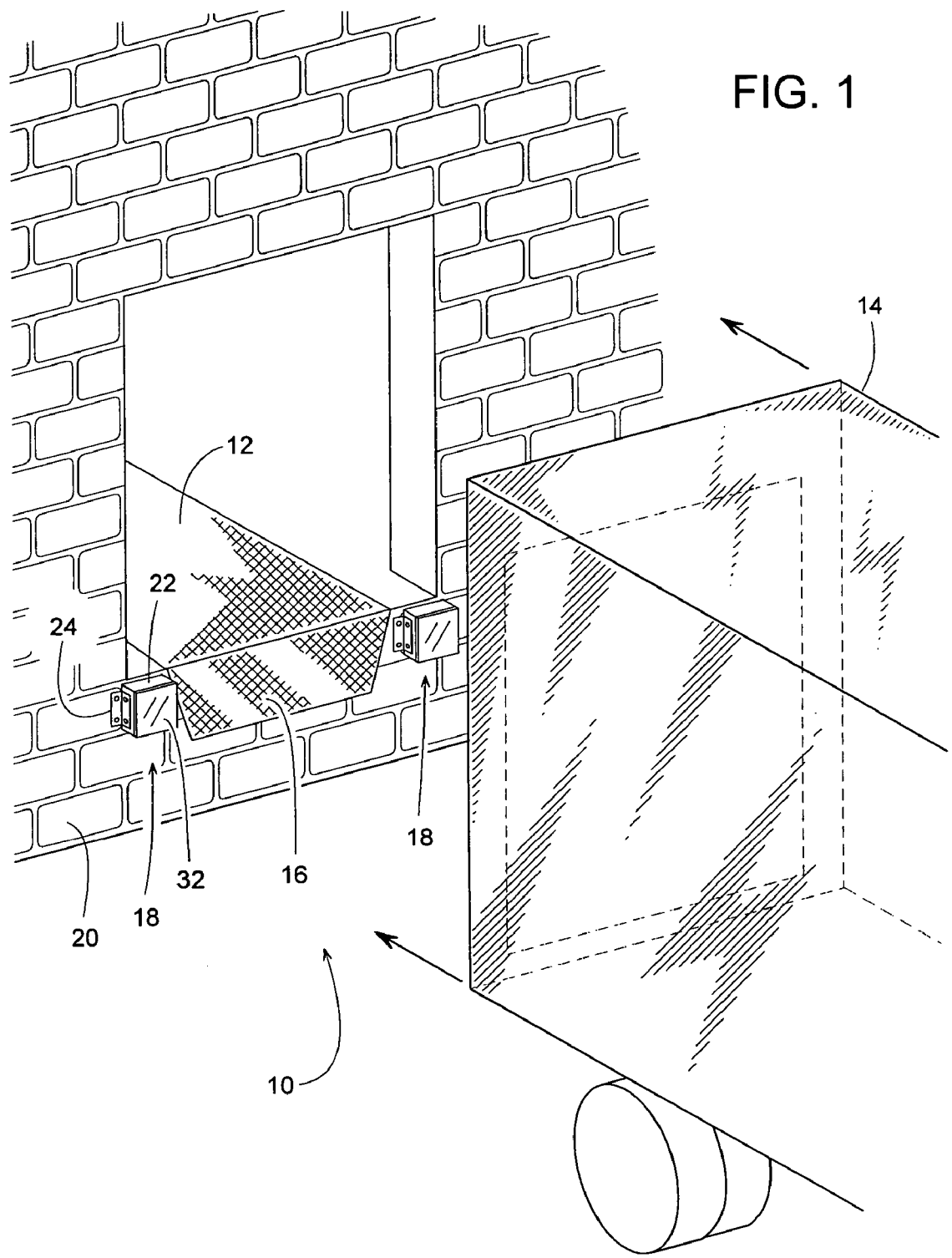
FIG. 1 is a perspective view of a vehicle backing into loading dock to which two bumper assemblies are mounted.
Figure 5:
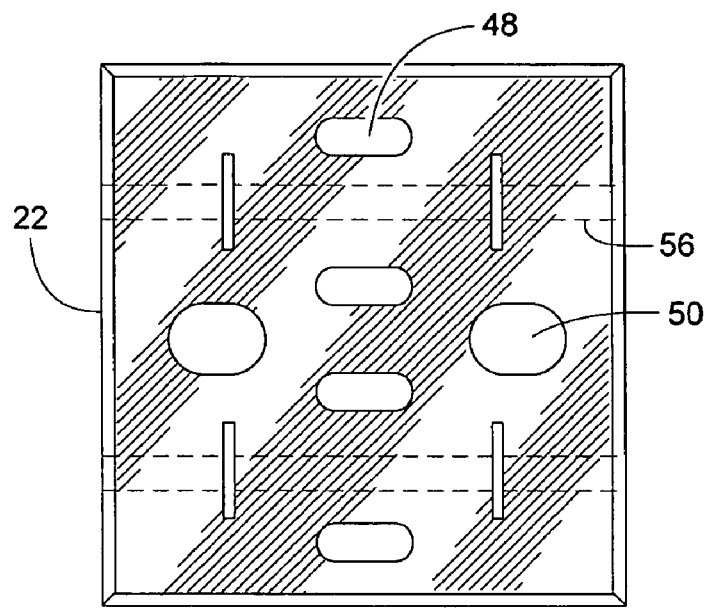
FIG. 5 is a front view of the bumper used in the bumper assembly of FIG. 2.
Figure 6:
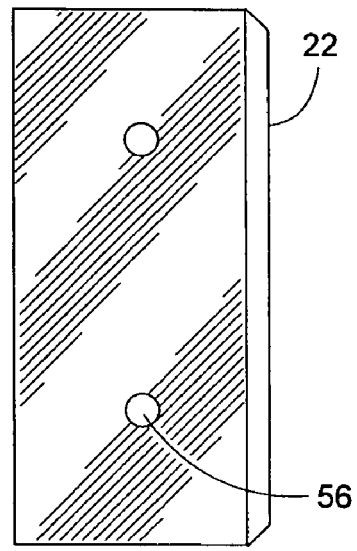
FIG. 6 is a side view of the bumper of FIG. 5.

FIG. 1 shows a loading dock 10 with a dock leveler 12. To absorb the impact from a vehicle 14 backing into the dock, to ensure adequate operating clearance between a lip 16 of dock leveler 12 and the back of vehicle 14, and/or to protect a dock seal (not shown) from being over compressed by the back end of vehicle 14, one or more bumper assemblies 18 can be attached to a dock wall 20, dock leveler 12, or some other suitable mounting surface of the loading dock.

In one embodiment, shown in FIGS. 1-6, bumper assembly 18 includes a compressible pad 22 interposed between two metal brackets 24. Pad 22 is resiliently compressible in response to the impact of vehicle 14 backing against it. In this context, "compressible" indicates that the pad will be compressed by the backing vehicle as it transmits the force of that vehicle to the dock wall, and then return to a relaxed shape when the force is removed. While all material have some degree of compressibility, the compressible pad of the embodiments herein is intended to compress substantially more that the relatively rigid/incompressible metal faceplate that overlays the compressible pad. With the addition of an anchor bolt 26, a base plate 28, weld seam 30, or some other suitable mounting hardware, brackets 24 help fasten bumper 22 to dock 10. A metal faceplate 32 overlays a front surface 34 of bumper 22 to protect the relatively soft bumper material from wear.

To hold bumper assembly 18 together, a tie rod 36 can extend through brackets 24, bumper 22, and metal mounting tabs 38. Tabs 38 can be welded to faceplate 32, and each tab can extend into a socket 40 of bumper 22. Tie rod 36 extending through an opening 42 of tab 38 is what couples faceplate 32 to pad 22. Opening 42 is preferably oversized or elongated to create sufficient clearance between tab 38 and tie rod 36 so that when vehicle 14 compresses pad 22, the compressive forces are not transferred to tie rod 36. As a result pad 22 receives the brunt of the impact, so tie rod 36 can be made relatively light.

It should be noted that tabs 38 and faceplate 32 are intentionally spaced apart from brackets 24 to avoid sliding frictional wear between those components as vehicles repeatedly compress bumper assembly 18. Also, in some cases, the vertical clearance between tie rod 36 and tab 38 is greater than the vertical clearance between tab 38 and a sidewall 44 of socket 40 to help avoid metal-to-metal contact between tie rod 36 and tab 38. To ensure that tie rod 36 is not completely loose and unsupported, the clearance between tie rod 36 and the corresponding hole in brackets 38 is less than the clearance between tie rod 36 and pad 22.

As vehicle 14 compresses pad 22, the bumper tends to bulge outward and press against an inner surface 46 of bracket 24. To minimize this pressure against bracket 24 and thus minimize the wear of pad 22 in this area, pad 22 can be provided with one or more compression cavities, such as cavities 48 and 50 of FIG. 5. With cavities 48 and 50, bumper 22 can bulge into these cavities, thereby reducing their volume and reducing the expansion or pressure against bracket 24. Cavities 48 and 50 can be blind-holes that extend only partway through pad 22, or cavities 48 and 50 can be thru-holes that extend completely through pad 22.

Figure 7:
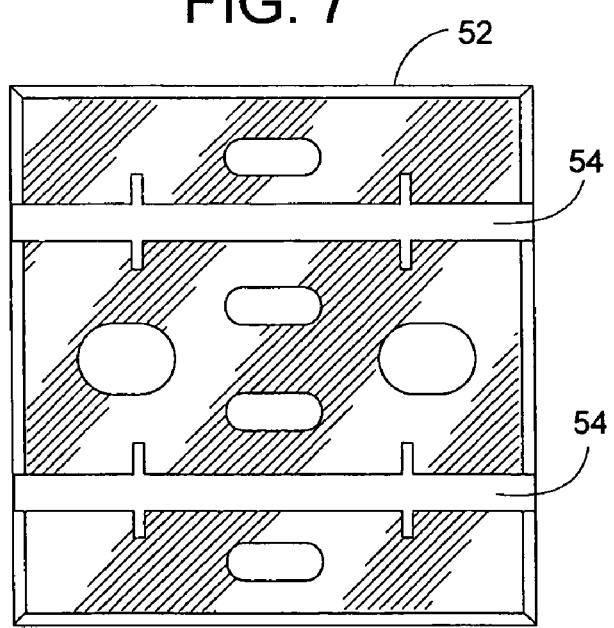
FIG. 7 is a front view of another embodiment of a bumper used in the bumper assembly of FIG. 2.
Figure 8:
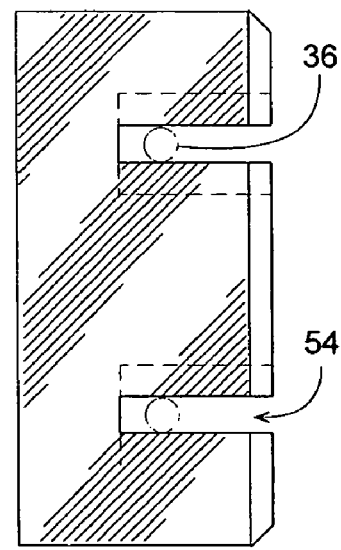
FIG. 8 is a side view of the bumper of FIG. 7.

FIGS. 7 and 8 show a variation of pad 22, wherein a bumper 52 includes a slot 54 for receiving tie rod 36. Slot 54 replaces a hole 56 through which tie rod 36 extends in bumper assembly 22. Slot 54 facilitates the manufacturability of bumper 52 in cases where pad 52 is molded of a unitary piece. With slot 54, pad 52 can be released from its injection mold without having to provide the mold with retractable draw pins for producing holes running perpendicular to each other such is the case with, for example, hole 56 and cavity 54.

FIG. 9 shows a variation where a faceplate 58 replaces faceplate 32. In this example, faceplate 58 includes one or more peripheral flanges 60 and 62 that overlie an upper bumper surface 64 and a lower bumper surface 66 respectively. Engagement between flange 60 and surface 64 or engagement between flange 62 and surface 66 limits the relative vertical movement between faceplate 58 and pad 22. This engagement can perhaps endure greater vertical loads than what could otherwise be endured by vertical engagement between tie rod 36 and tab 38 or vertical engagement between a narrow edge of tab 38 and socket 40 of bumper 22. Moreover, flanges 60 and 62 can inhibit pad 22 from spreading apart in the area of slot 54 (FIG. 7).

FIG. 10 shows a bumper assembly 68 where a tab 70 replaces tab 38. In this example, an opening 72 to receive tie rod 36 is created by having tab 70 be L-shaped. Thus, the "opening" defined by the metal mounting tab does necessarily have to be a hole, but rather can be a recess, detent, concavity, or the like.

FIG. 11 shows a bumper assembly 72 where unitary compressible pad 22 is replaced by a compressible pad 74 comprising a plurality of laminations 76. The plurality of laminations can be a stack of pads made of a variety of materials including, but not limited to, rubber tires or belting material.

Although the invention is described with respect to various embodiments, modifications thereto will be apparent to those skilled in the art. Various features described with respect to one embodiment may be readily applied to other embodiments. Therefore, the scope of the invention is to be determined by reference to the following claims.

I claim:

1. A bumper assembly that may be subject to an impact from a vehicle at a loading dock, the bumper assembly comprising:
   a metal bracket attachable to the loading dock;
   a compressible pad adjacent the metal bracket;
   a metal faceplate adjacent the compressible pad for receiving the impact from the vehicle;
   a metal mounting tab extending from the metal faceplate and protruding into the compressible pad such that at least a portion of the compressible pad is positioned between the metal mounting tab and the metal bracket to prevent engagement between the metal mounting tab and the metal bracket, wherein the metal mounting tab defines an opening; and
   a securing member that extends through the opening to at least partially couple the metal mounting tab and the metal faceplate to the metal bracket.

2. The bumper assembly of claim 1, wherein the metal mounting tab protrudes into a socket defined by the compressible pad such that an interaction between the metal mounting tab and the socket limits a relative vertical movement between the metal faceplate and the compressible pad.

3. The bumper assembly of claim 1, wherein the compressible pad defines a plurality of compression cavities whose volumes decrease to reduce an extent to which the compressible pad expands outward in a direction parallel to the securing member as the compressible pad is compressed between the loading dock and the metal faceplate.

4. The bumper assembly of claim 1, wherein the compressible pad is at least partially defined by an upper pad surface and a lower pad surface, and further comprising a peripheral flange extending from the faceplate and engaging at least one of the upper pad surface or the lower pad surface to limit relative vertical movement between the metal faceplate and the compressible pad.

5. The bumper assembly of claim 1, wherein the compressible pad comprises a plurality of laminations.

6. The bumper assembly of claim 1, wherein the compressible pad is a unitary piece.

7. The bumper assembly of claim 1, wherein the securing member extends along a slot defined by the compressible pad.

8. The bumper assembly of claim 1, wherein more clearance exists between the securing member and the compressible pad than what exists between the securing member and the metal bracket.

9. The bumper assembly of claim 1, wherein the opening in the metal mounting tab is a hole.

10. The bumper assembly of claim 1, wherein the opening in the metal mounting tab is a concavity.

11. The bumper assembly of claim 1, wherein the securing member comprises a tie rod.

12. The bumper assembly of claim 1, wherein the metal bracket remains continually spaced-apart from both the metal mounting tab and the metal faceplate.

13. A bumper assembly that may be subject to an impact from a vehicle at a loading dock, the bumper assembly comprising:
   a metal bracket attachable to the loading dock;
   a compressible pad adjacent the metal bracket, wherein the compressible pad defines a socket;
   a metal faceplate adjacent the compressible pad for receiving the impact from the vehicle;
   a metal mounting tab extending from the metal faceplate and into the socket of the compressible pad such that the metal mounting tab inside the socket limits relative vertical movement between the metal faceplate and the compressible pad, the metal mounting tab also defining an opening; and
   a tie rod extending through the opening to at least partially couple the metal mounting tab and the metal faceplate to the metal bracket.

14. The bumper assembly of claim 13, wherein the compressible pad defines a plurality of compression cavities whose volumes decrease to reduce an extent to which the compressible pad expands outward in a direction parallel to the tie rods as the compressible pad is compressed between the loading dock and the metal faceplate.

15. The bumper assembly of claim 13, wherein the compressible pad is at least partially defined by an upper pad surface and a lower pad surface, and further comprising a peripheral flange extending from the faceplate and engaging at least one of the upper pad surface and the lower pad surface to limit relative vertical movement between the metal faceplate and the compressible pad.

16. The bumper assembly of claim 13, wherein the compressible pad comprises a plurality of laminations.

17. The bumper assembly of claim 13, wherein the compressible pad is a unitary piece.

18. The bumper assembly of claim 13, wherein the tie rod extends along a slot defined by the compressible pad.

19. The bumper assembly of claim 13, wherein more clearance exists between the tie rod and the compressible pad than what exists between the tie rod and the metal bracket.

20. The bumper assembly of claim 13, wherein the metal bracket remains continually spaced-apart from both the metal mounting tab and the metal faceplate.

21. A bumper assembly that may be subject to an impact from a vehicle at a loading dock, the bumper assembly comprising:
   a metal bracket attachable to the loading dock;
   a compressible pad adjacent the metal bracket, wherein the compressible pad is a unitary piece defining a socket and a plurality of compression cavities, the plurality of compression cavities having volumes that decrease to reduce an extent to which the compressible pad expands outwardly as the compressible pad is compressed between the loading dock and vehicle;
   a metal faceplate adjacent the compressible pad for receiving the impact from the vehicle;
   a metal mounting tab extending from the metal faceplate and into the socket of the compressible pad such that the metal mounting tab inside the socket limits relative vertical movement between the metal faceplate and the compressible pad, the metal mounting tab also defining an opening; and
   a tie rod extending through the opening to at least partially couple the metal mounting tab and the metal faceplate to the metal bracket.

22. The bumper assembly of claim 21, wherein the metal bracket remains continually spaced-apart from both the metal mounting tab and the metal faceplate.

* * * * *

UNITED STATES PATENT AND TRADEMARK OFFICE
CERTIFICATE OF CORRECTION

PATENT NO.         : 7,584,943 B2                                          Page 1 of 1
APPLICATION NO. : 11/321807
DATED              : September 8, 2009
INVENTOR(S)        : Joe DiBiase It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Fourteenth Day of September, 2010

David J. Kappos
*Director of the United States Patent and Trademark Office*